US012696213B2

(12) United States Patent
Jiang

(10) Patent No.: US 12,696,213 B2
(45) Date of Patent: Jul. 28, 2026

(54) RECEIVING CONTROL METHOD AND DEVICE

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 396 days.

(21) Appl. No.: 18/269,934

(22) PCT Filed: Dec. 31, 2020

(86) PCT No.: PCT/CN2020/142554
§ 371 (c)(1),
(2) Date: Jun. 27, 2023

(87) PCT Pub. No.: WO2022/141596
PCT Pub. Date: Jul. 7, 2022

(65) Prior Publication Data
US 2024/0073845 A1 Feb. 29, 2024

(51) Int. Cl.
*H04W 56/00* (2009.01)
*H04W 74/0833* (2024.01)

(52) U.S. Cl.
CPC ..... *H04W 56/005* (2013.01); *H04W 74/0833* (2013.01)

(58) Field of Classification Search
CPC .......... H04W 56/005; H04W 74/0833; H04W 56/0045; H04W 56/004; H04B 7/18513; Y02D 30/70
See application file for complete search history.

(56) References Cited

U.S. PATENT DOCUMENTS

2019/0380112 A1 12/2019 Lee et al.
2022/0386263 A1* 12/2022 Miao ..................... H04L 5/0091
2024/0023051 A1* 1/2024 Harrebek .......... H04W 56/0045

FOREIGN PATENT DOCUMENTS

CN 110876177 A 3/2020
CN 111919489 A 11/2020
WO WO 2020258962 A1 12/2020

OTHER PUBLICATIONS

European Patent Application No. 20967934.9, Search Report and Opinion dated Oct. 7, 2024, 8 pages.
PCT/CN2020/142554, English translation of International Search Report dated Sep. 28, 2021, 2 pages.
Indian Patent Application No. 202347050189, Office Action dated May 6, 2026, 7 pages.

* cited by examiner

*Primary Examiner* — Charles C Jiang
*Assistant Examiner* — Rachel Elizabeth Marks
(74) *Attorney, Agent, or Firm* — Cozen O'Connor

(57) ABSTRACT

A receiving control method includes: receiving downlink information transmitted by a base station, at least after a round-trip time between the terminal and the base station after transmitting uplink information to the base station. The round-trip time may correspond to a moment of completing a transmission of the uplink information. The uplink information may be a first message of a random access procedure, a physical uplink channel for transmitting a preconfigured uplink resource, a first transmission among multiple uplink transmissions, or feedback information carrying a downlink hybrid automatic retransmission request.

17 Claims, 7 Drawing Sheets receiving a second message of random access procedure, in which the second message of random access procedure carries an adjustment value of an uplink timing advance — S501 adjusting the uplink timing advance according to the adjustment value — S502 updating the round-trip time according to an update configuration setting the moment of completing the transmission of the uplink information as an update moment — S201 receiving downlink information transmitted by a base station, at least after a round-trip time between the terminal and the base station after transmitting uplink information to the base station — S101

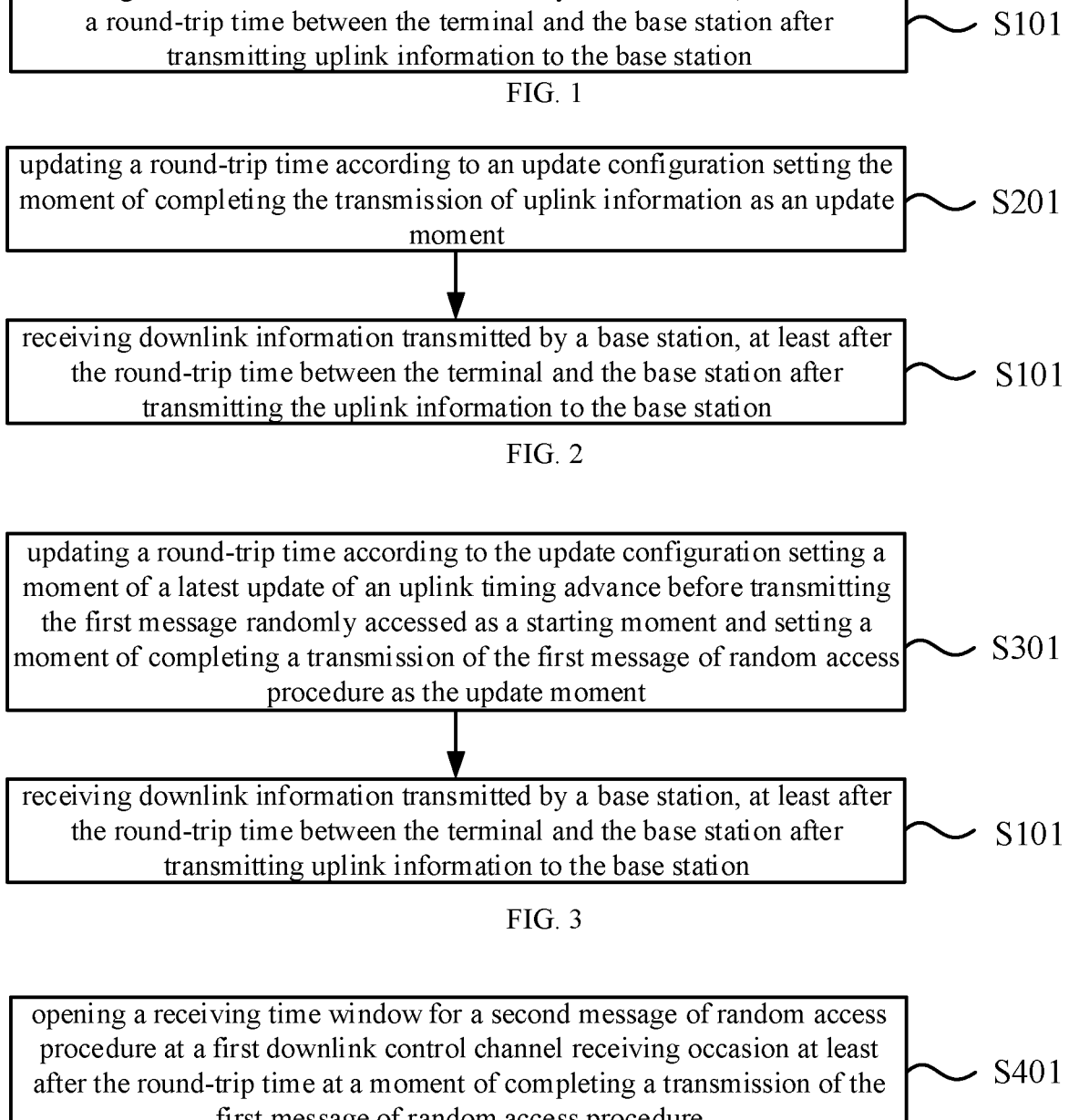

receiving downlink information transmitted by a base station, at least after a round-trip time between the terminal and the base station after transmitting uplink information to the base station    ⟿ S101

FIG. 1 updating a round-trip time according to an update configuration setting the moment of completing the transmission of uplink information as an update moment    ⟿ S201 receiving downlink information transmitted by a base station, at least after the round-trip time between the terminal and the base station after transmitting the uplink information to the base station    ⟿ S101

FIG. 2 updating a round-trip time according to the update configuration setting a moment of a latest update of an uplink timing advance before transmitting the first message randomly accessed as a starting moment and setting a moment of completing a transmission of the first message of random access procedure as the update moment    ⟿ S301 receiving downlink information transmitted by a base station, at least after the round-trip time between the terminal and the base station after transmitting uplink information to the base station    ⟿ S101

FIG. 3 opening a receiving time window for a second message of random access procedure at a first downlink control channel receiving occasion at least after the round-trip time at a moment of completing a transmission of the first message of random access procedure    ⟿ S401

FIG. 4

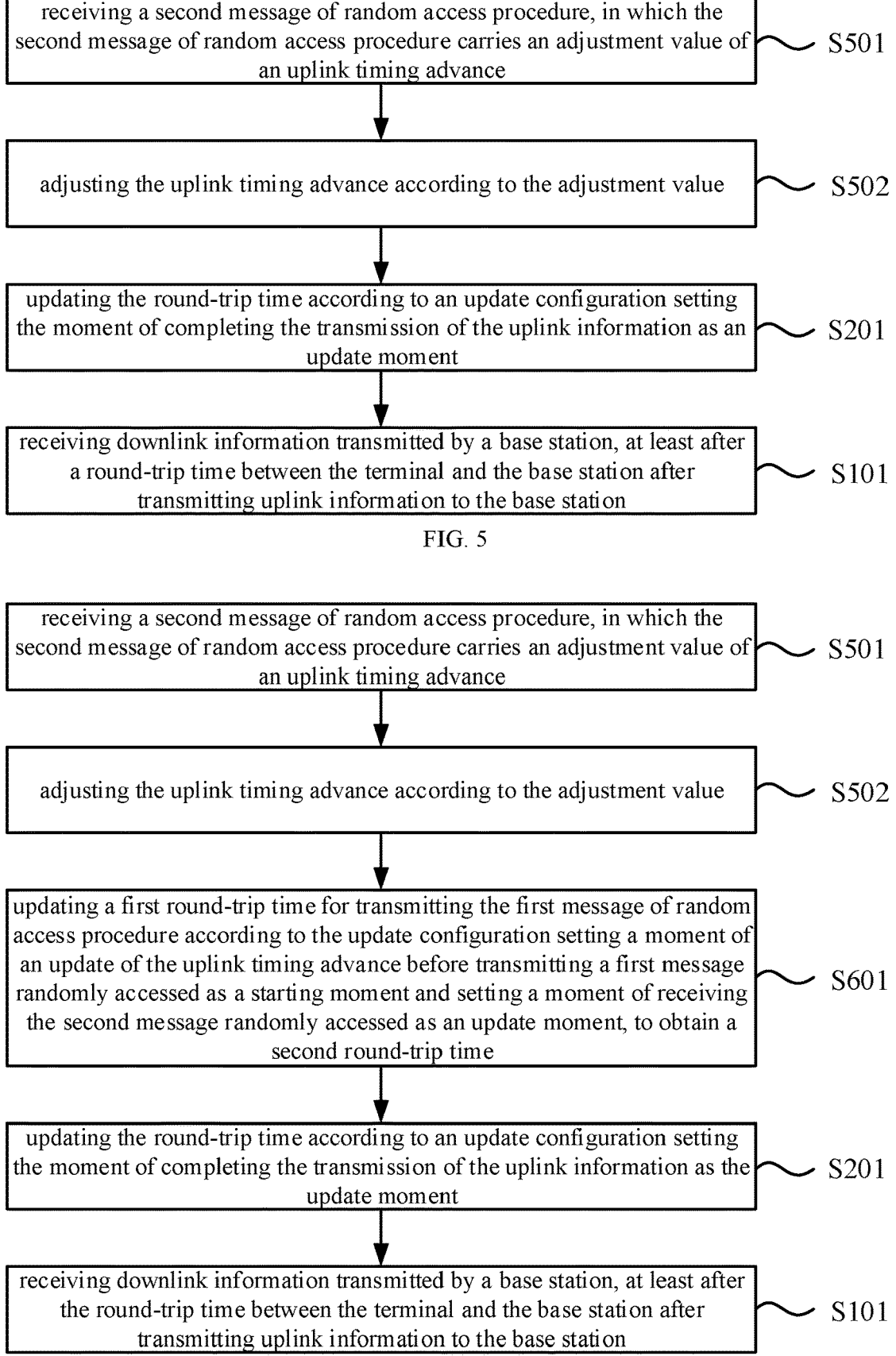

receiving a second message of random access procedure, in which the second message of random access procedure carries an adjustment value of an uplink timing advance ~ S501 adjusting the uplink timing advance according to the adjustment value ~ S502 updating the round-trip time according to an update configuration setting the moment of completing the transmission of the uplink information as an update moment ~ S201 receiving downlink information transmitted by a base station, at least after a round-trip time between the terminal and the base station after transmitting uplink information to the base station ~ S101

FIG. 5 receiving a second message of random access procedure, in which the second message of random access procedure carries an adjustment value of an uplink timing advance ~ S501 adjusting the uplink timing advance according to the adjustment value ~ S502 updating a first round-trip time for transmitting the first message of random access procedure according to the update configuration setting a moment of an update of the uplink timing advance before transmitting a first message randomly accessed as a starting moment and setting a moment of receiving the second message randomly accessed as an update moment, to obtain a second round-trip time ~ S601 updating the round-trip time according to an update configuration setting the moment of completing the transmission of the uplink information as the update moment ~ S201 receiving downlink information transmitted by a base station, at least after the round-trip time between the terminal and the base station after transmitting uplink information to the base station ~ S101

FIG. 6

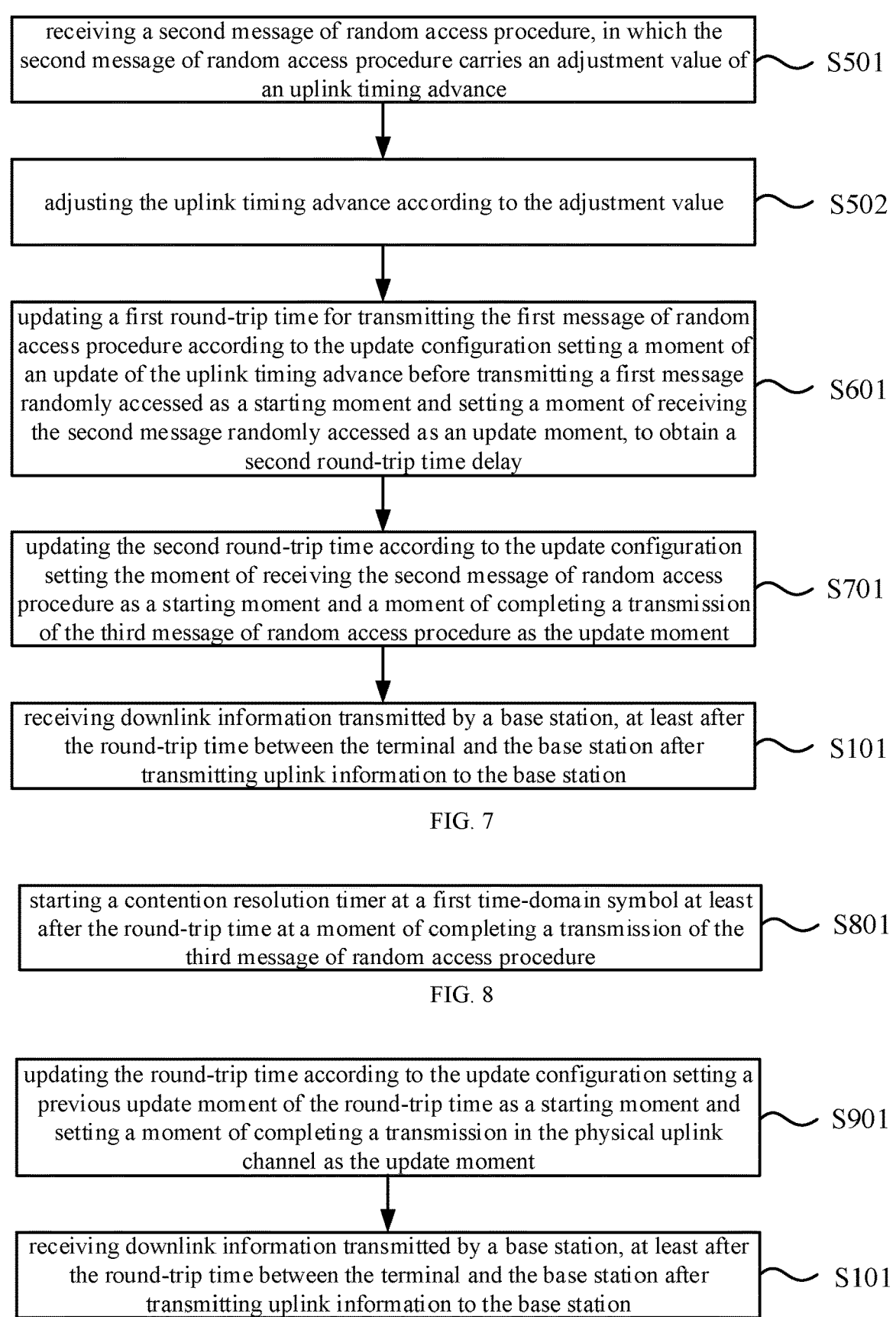

receiving a second message of random access procedure, in which the second message of random access procedure carries an adjustment value of an uplink timing advance — S501 adjusting the uplink timing advance according to the adjustment value — S502 updating a first round-trip time for transmitting the first message of random access procedure according to the update configuration setting a moment of an update of the uplink timing advance before transmitting a first message randomly accessed as a starting moment and setting a moment of receiving the second message randomly accessed as an update moment, to obtain a second round-trip time delay — S601 updating the second round-trip time according to the update configuration setting the moment of receiving the second message of random access procedure as a starting moment and a moment of completing a transmission of the third message of random access procedure as the update moment — S701 receiving downlink information transmitted by a base station, at least after the round-trip time between the terminal and the base station after transmitting uplink information to the base station — S101

FIG. 7 starting a contention resolution timer at a first time-domain symbol at least after the round-trip time at a moment of completing a transmission of the third message of random access procedure — S801

FIG. 8 updating the round-trip time according to the update configuration setting a previous update moment of the round-trip time as a starting moment and setting a moment of completing a transmission in the physical uplink channel as the update moment — S901 receiving downlink information transmitted by a base station, at least after the round-trip time between the terminal and the base station after transmitting uplink information to the base station — S101

FIG. 9 starting a response window timer for a preconfigured uplink resource after 4 subframes following a subframe at a moment of completing a transmission in the physical uplink channel and after the round-trip time          S1001

FIG. 10 updating the round-trip time according to the update configuration setting a previous update moment of the round-trip time as a starting moment and setting a moment of completing the first transmission as the update moment          S1101 receiving downlink information transmitted by a base station, at least after the round-trip time between the terminal and the base station after transmitting uplink information to the base station          S101

FIG. 11 starting a discontinuous reception hybrid automatic retransmission request round-trip time uplink timer at least after the round-trip time at a moment of completing the first transmission          S1201

FIG. 12 updating the round-trip time according to the update configuration setting a previous update moment of the round-trip time as a starting moment and setting a moment of completing the first retransmission as the update moment          S1301 receiving downlink information transmitted by a base station, at least after the round-trip time between the terminal and the base station after transmitting uplink information to the base station          S101

FIG. 13 starting a discontinuous reception hybrid automatic retransmission request round-trip time uplink timer at least after the round-trip time at a moment of completing the first retransmission          S1401

FIG. 14

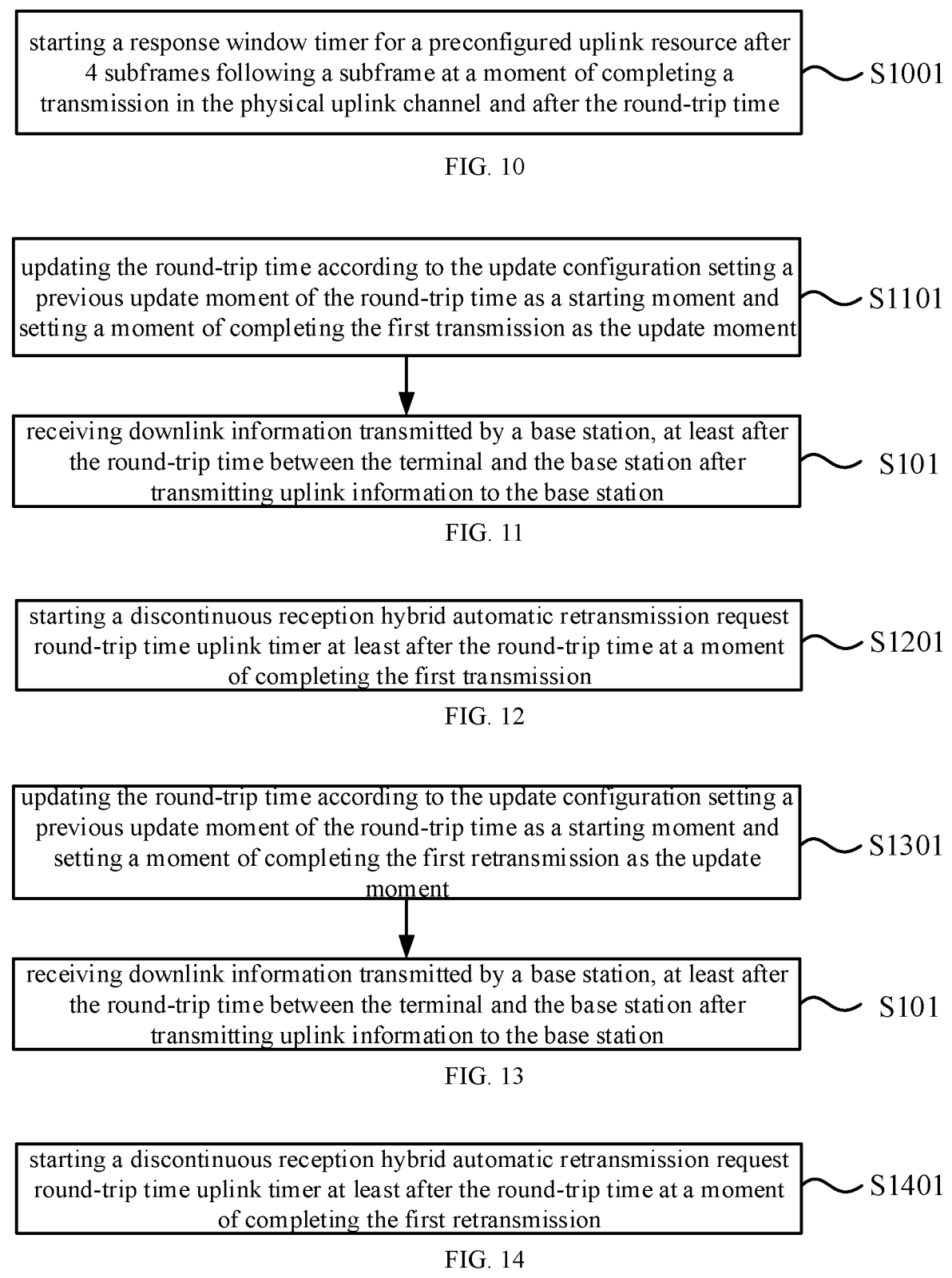

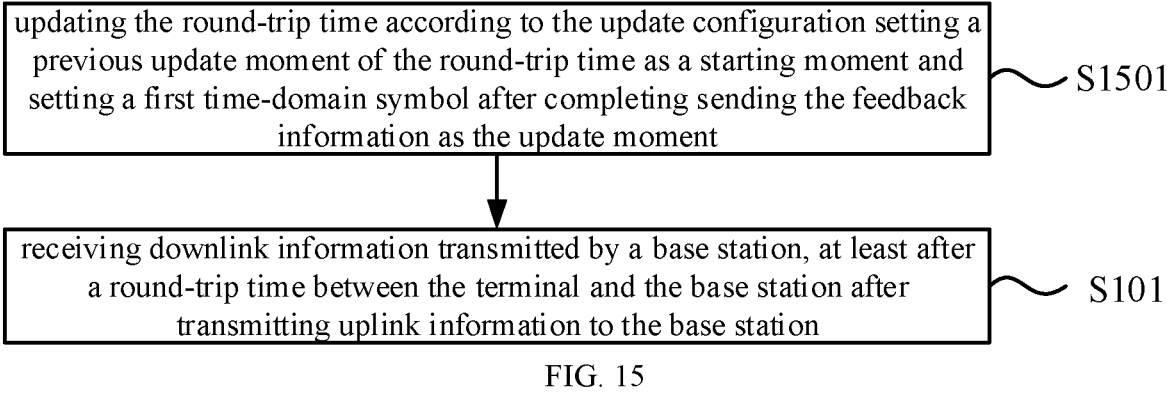

updating the round-trip time according to the update configuration setting a previous update moment of the round-trip time as a starting moment and setting a first time-domain symbol after completing sending the feedback information as the update moment　　S1501 receiving downlink information transmitted by a base station, at least after a round-trip time between the terminal and the base station after transmitting uplink information to the base station　　S101

FIG. 15

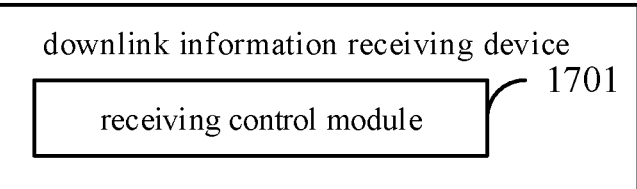

starting a discontinuous reception hybrid automatic retransmission request round-trip time downlink timer at least after the round-trip time at a moment of completing sending the feedback information　　S1601

FIG. 16 downlink information receiving device receiving control module　　1701

FIG. 17

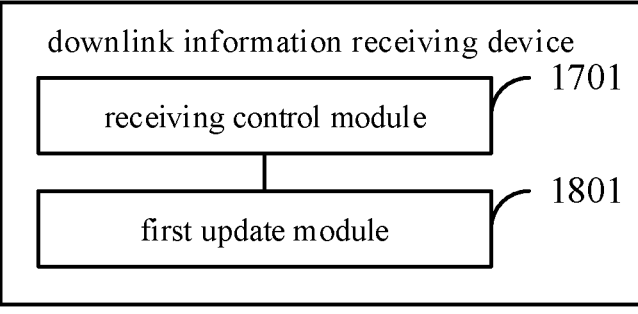

downlink information receiving device receiving control module　　1701 first update module　　1801

FIG. 18

RECEIVING CONTROL METHOD AND DEVICE

CROSS-REFERENCE TO RELATED APPLICATION

This application is a U.S. national phase application of International Application No. PCT/CN2020/142554, filed Dec. 31, 2020, the entire contents of which are incorporated herein by reference.

TECHNICAL FIELD

The present disclosure relates to a technical field of wireless communication, and more particularly to a receiving control method, a receiving control device, an electronic device, and a computer-readable storage medium.

BACKGROUND

In the communication process between a terminal and a base station in a wireless communication network, the distance between the terminal and the base station is generally short, so it may be assumed that a signal sent by the terminal reaches the base station immediately, and a signal sent by the base station also reaches the terminal immediately. Therefore, after the terminal sends a signal to the base station, a signal fed back by the base station can reach the terminal quickly, so the terminal can continuously receive the downlink signals sent by the base station.

However, in non-terrestrial networks (NTN for short), a terminal communicates with a ground base station via a satellite. As the satellite is in orbit, it may take a long time for a signal to be sent from the ground to the satellite, and then sent from the satellite back to the ground, so a large time delay will be incurred. If the terminal continuously receives downlink signals sent by the base station, it experiences a long delay, which will cause unnecessary power consumption.

SUMMARY

According to a first aspect of embodiments of the present disclosure, a receiving control method is provided, which is performed by a terminal and includes: receiving downlink information transmitted by a base station, at least after a round-trip time between the terminal and the base station after transmitting uplink information to the base station.

According to a second aspect of embodiments of the present disclosure, a receiving control method is provided, which is performed by a base station and includes: receiving uplink information transmitted by a terminal, at least after a round-trip time between the terminal and the base station after transmitting downlink information to the terminal.

According to a third aspect of embodiments of the present disclosure, an electronic device is provided, which includes: a processor; and a memory configured to store instructions executable by the processor. The processor is configured to execute the above method performed by the terminal.

According to a fourth aspect of embodiments of the present disclosure, an electronic device is provided, which includes: a processor; and a memory configured to store instructions executable by the processor. The processor is configured to execute the above method performed by the base station.

According to a fifth aspect of embodiments of the present disclosure, a computer-readable storage medium is provided, which has stored therein computer programs that, when executed by a processor, cause steps in the above method performed by the terminal to be implemented.

According to a sixth aspect of embodiments of the present disclosure, a computer-readable storage medium is provided, which has stored therein computer programs that, when executed by a processor, cause steps in the above method performed by the base station to be implemented.

BRIEF DESCRIPTION OF THE DRAWINGS

In order to clearly illustrate the technical solutions in embodiments of the present disclosure, the accompanying drawings to be used in the description for embodiments of the present disclosure will be briefly introduced below. Apparently, the drawings in the following description only show some embodiments of the present disclosure. For those ordinarily skilled in the art, other drawings may also be obtained according to these drawings without any creative effort.

FIG. 1 is a schematic flowchart showing a receiving control method performed by a terminal, according to an embodiment of the present disclosure.

FIG. 2 is a schematic flowchart showing a receiving control method, according to an embodiment of the present disclosure.

FIG. 3 is a schematic flowchart showing a receiving control method, according to an embodiment of the present disclosure.

FIG. 4 is a schematic flowchart showing a receiving control method, according to an embodiment of the present disclosure.

FIG. 5 is a schematic flowchart showing a receiving control method, according to an embodiment of the present disclosure.

FIG. 6 is a schematic flowchart showing a receiving control method, according to an embodiment of the present disclosure.

FIG. 7 is a schematic flowchart showing a receiving control method, according to an embodiment of the present disclosure.

FIG. 8 is a schematic flowchart showing a receiving control method, according to an embodiment of the present disclosure.

FIG. 9 is a schematic flowchart showing a receiving control method, according to an embodiment of the present disclosure.

FIG. 10 is a schematic flowchart showing a receiving control method, according to an embodiment of the present disclosure.

FIG. 11 is a schematic flowchart showing a receiving control method, according to an embodiment of the present disclosure.

FIG. 12 is a schematic flowchart showing a receiving control method, according to an embodiment of the present disclosure.

FIG. 13 is a schematic flowchart showing a receiving control method, according to an embodiment of the present disclosure.

FIG. 14 is a schematic flowchart showing a receiving control method, according to an embodiment of the present disclosure.

FIG. 15 is a schematic flowchart showing a receiving control method, according to an embodiment of the present disclosure.

FIG. 16 is a schematic flowchart showing a receiving control method, according to an embodiment of the present disclosure.

FIG. 17 is a schematic block diagram showing a receiving control device, according to an embodiment of the present disclosure.

FIG. 18 is a schematic block diagram showing a receiving control device, according to an embodiment of the present disclosure.

Figure 19:
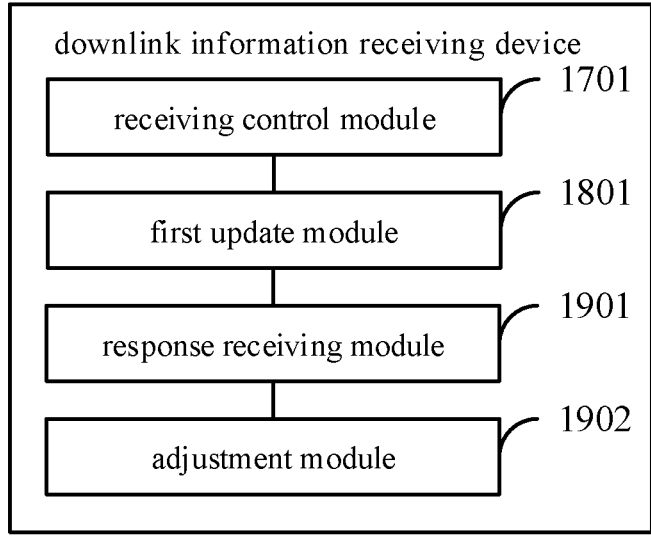

FIG. 19 is a schematic block diagram showing a receiving control device, according to an embodiment of the present disclosure.

Figure 20:
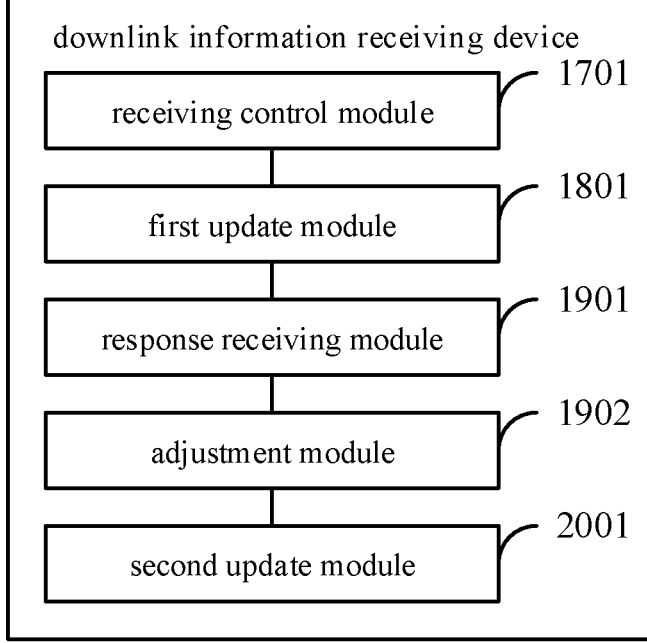

FIG. 20 is a schematic block diagram showing a receiving control device, according to an embodiment of the present disclosure.

Figure 21:
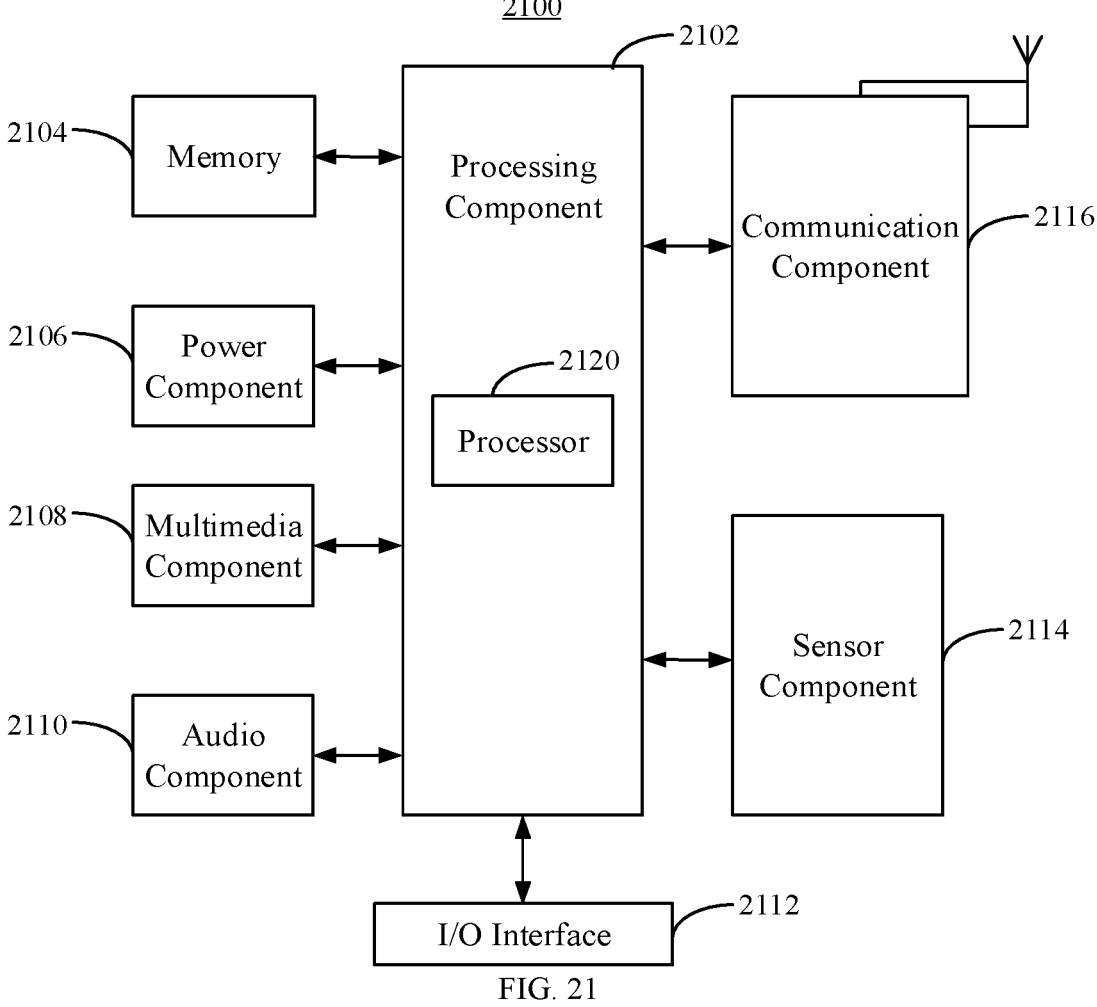

FIG. 21 is a schematic block diagram showing a device for receiving control, according to an embodiment of the present disclosure.

DETAILED DESCRIPTION

The technical solutions in embodiments of the present disclosure will be described clearly and completely below with reference to the accompanying drawings in embodiments of the present disclosure. Apparently, the described embodiments are only some embodiments of the present disclosure, rather than all embodiments of the present disclosure. All other embodiments obtained by those ordinarily skilled in the art based on embodiments of the present disclosure without making creative works belong to the protection scope of the present disclosure.

FIG. 1 is a schematic flowchart showing a receiving control method, according to an embodiment of the present disclosure. The receiving control method shown in this embodiment may be performed by a terminal, and the terminal includes, but is not limited to, electronic devices, such as a mobile phone, a tablet computer, a wearable device, a sensor, an Internet of Things device, etc. The terminal may serve as a user equipment to communicate with a base station, and the base station includes, but is not limited to, a 4G base station, a 5G base station, or a 6G base station.

In an embodiment, a terminal and a base station are located on the ground, and the terminal and the base station can communicate in Non-Terrestrial Networks through an aerial device. For example, the base station first sends information to the aerial device, and then the aerial device sends the information to the terminal. The aerial device includes, but is not limited to, a satellite, an unmanned aircraft, an aerial platform, etc., and the aerial device may move in the air.

As shown in FIG. 1, the receiving control method may include the following step:

in step S101, receiving downlink information transmitted by a base station, at least after a round-trip time between the terminal and the base station after transmitting uplink information to the base station.

In an embodiment, the round-trip time between the terminal and the base station may be determined according to a distance from the base station to an aerial device, a distance from the aerial device to the base station, and a transmission speed of a signal.

When the terminal transmits the uplink information to the base station, the uplink information needs to be transmitted from the terminal to the aerial device, and then from the aerial device to the base station. The downlink information sent by the base station for the uplink information needs to be transmitted from the base station to the aerial device, and then from the aerial device to the terminal. Therefore, from the terminal sending the uplink information to the base station, to the terminal receiving the downlink information from the base station, it needs to take the round-trip time, even if the time for the base station to process the uplink information and generate the downlink information is ignored.

According to this embodiment, the terminal may not continuously receive the downlink information transmitted by the base station for the uplink information immediately after transmitting the uplink information to the base station, but at least wait for the round-trip time between the terminal and the base station before receiving the downlink information transmitted by the base station. During the waiting process, the terminal may not monitor a downlink channel on which the base station sends the downlink information, which is beneficial to reduce the power consumption of the terminal.

In some embodiments, the round-trip time corresponds to a moment of completing a transmission of the uplink information.

As the satellite and other aerial devices are generally in a high-speed motion, the distance from the terminal to the satellite and the distance from the satellite to the base station will change, resulting in the round-trip time between the terminal and the base station will vary with the movement of the aerial device. Therefore, the round-trip time when the terminal completes the uplink transmission each time is different from that when the terminal completes the uplink transmission last time.

In this embodiment, the round-trip time corresponding to the moment of completing the transmission of the uplink information can be determined, so that the round-trip time at the moment of completing the transmission of the uplink information can be determined accurately, and the downlink information transmitted by the base station is received at least waiting for the round-trip time after transmitting the uplink information to the base station, which helps to ensure the accuracy of the waiting time.

FIG. 2 is a schematic flowchart showing a receiving control method, according to an embodiment of the present disclosure. As shown in FIG. 2, in some embodiments, the method further includes:

in step S201, updating the round-trip time according to an update configuration setting the moment of completing the transmission of the uplink information as an update moment.

In an embodiment, the round-trip time may be updated according to the update configuration setting the moment of completing the transmission of the uplink information as the update moment, so that the updated round-trip time corresponds to the moment of completing the transmission of the uplink information.

As the satellite and other aerial devices are generally in a high-speed motion, the distance from the terminal to the satellite and the distance from the satellite to the base station will change, resulting in the change of the round-trip time between the terminal and the base station, which is specifically reflected in the continue change of an uplink timing advance with the movement of the aerial device. Although the network can continuously send an adjustment command for the uplink timing advance (TA command for short) to the terminal to adjust the uplink timing advance, so as to ensure that the adjusted uplink timing advance meets the change in a current round trip time (RTT for short) among the terminal, the aerial device, and the base station. However, for the satellite located at a high altitude, such as a satellite 600 kilometers above the ground, the change in RTT can reach 40 s/s. However, in some cases, for example, when a subcarrier is 240 KHz, a maximum value that can be adjusted by the network to the TA through the adjustment command is 1 s. Therefore, the adjustment command needs to be sent 40 times per second to the terminal when the change in RTT is 40 μs/s, which causes a lot of signaling overhead and increases the power consumption of the terminal.

However, according to embodiments of the present disclosure, the terminal may update the round-trip time according to the update configuration. For example, the terminal may update the uplink timing advance first according to the update configuration, and then determine the round-trip time according to the updated uplink timing advance. In this way, during the movement of the aerial device, even if the network does not send the adjustment command of the uplink timing advance to the terminal, the adjustment of the uplink timing advance can also be completed automatically, and then the adjustment of the round-trip time is completed, which is beneficial to reduce the signaling overhead and reduce the power consumption of the terminal.

Moreover, compared with the uplink timing advance before the update, the updated uplink timing advance has a higher degree of adaptability to a spatial relationship among the terminal, the satellite, and the base station at the update moment, so the uplink timing advance required at the update moment can be determined more accurately, and the determined round-trip time is more accurate.

In an embodiment, the uplink timing advance may be obtained according to a terminal specific timing advance (UE specific TA) and a common timing offset. The specific timing advance is provided by the network through broadcast, and may also be determined by the terminal autonomously. The common timing offset is provided by the network through broadcast or a dedicated message. The above update configuration may be applicable to the specific timing advance, may also be applicable to the common timing offset, and may also be applicable to the overall uplink timing advance.

In an embodiment, the uplink timing advance is less than or equal to the round-trip time between the terminal and the base station. For example, the uplink timing advance is equal to the round-trip time between the terminal and the base station, then determining the round-trip time according to the updated uplink timing advance is to use the updated uplink timing advance as the round-trip time. If the uplink timing advance is less than the round-trip time between the terminal and the base station, then determining the round-trip time according to the updated uplink timing advance is to obtain the round-trip time by adding the updated uplink timing advance to a network broadcasted value. The broadcasted value may be called the common timing offset or a common reference timing advance.

In an embodiment, the terminal may determine the update configuration of the uplink timing advance autonomously, and may also obtain the update configuration from the network. The update configuration may be kept unchanged or changed, for example, at each update moment in subsequent embodiments, the terminal re-determines the update configuration.

In an embodiment, the update configuration may include an update frequency of the uplink timing advance, an update step of the uplink timing advance, etc. The two parameters of the update frequency and the update step may be collectively referred to as a time drift rate R, i.e., an update amount of the uplink timing advance per unit time. The update frequency may be determined based on the unit time, and the unit time may be one or more frames, subframes, time domain symbols, time slots, seconds, milliseconds, etc.

For example, the terminal determines the uplink timing advance according to the following formula:

$$TA=(N_{TA}+N_{TA,offset}[+X])\times T_c[+X];$$

where X is the common timing offset, $N_{TA}$ is obtained based on the terminal specific timing advance, $N_{TA,offset}$ is a TA offset, which may be known, and Tc is a known defined value.

It should be noted that X appears only once in the above formula. For example, X appears in parentheses, then $TA=(N_{TA}+N_{TA,offset}+X)\times T_c$, and in this case, X may be a unitless quantity. For example, X appears at the end of the above formula, then $TA=(N_{TA}+N_{TA,offset})\times T_c+X$, and in this case, a unit of X may be a time unit, such as a millisecond, a second, a frame, etc.

In an embodiment, the common timing offset broadcasted by the network may include two parts. One part is a common timing offset that needs to be compensated by the terminal, such as called $X_1$, and the other part is a common timing offset that needs to be compensated by the network (for example, the satellite or the base station), such as called $X_2$. The terminal may determine the uplink timing advance according to the above-mentioned embodiments according to the common timing offset $X_1$ that needs to be compensated by the terminal. In addition, a cell may also broadcast a sum of $X_1$ and $X_2$, or one of $X_1$ and $X_2$, then the other one of $X_1$ and $X_2$ may be obtained by the terminal through subtraction.

For example, the update configuration is applicable to the $N_{TA}$, that is, the terminal updates the $N_{TA}$ according to the update configuration, so as to achieve the update of the TA, then the update step may be an offset of the $N_{TA}$, or a value of a same dimension as the $N_{TA}$.

For example, the update configuration is applicable to the common timing offset X, that is, the terminal updates the X according to the update configuration, then the update step may be an offset of the X, with the same dimension as the X.

For example, the update configuration is applicable to the overall uplink timing advance TA, that is, the terminal updates the TA according to the update configuration, then the update step may be an offset of the TA, or a value whose unit is a time unit.

In the example where the update configuration is applicable to the overall uplink timing advance, the round-trip time is updated according to the time drift rate R in the update configuration. In the example where the uplink timing advance is updated, an uplink timing advance $TA_0$ at a starting moment may be determined first, and a time length t from the starting moment to an update moment may be determined, then an updated uplink timing advance is $TA=TA_0+t\times R$.

In an embodiment, the terminal may determine the starting moment for updating the uplink timing advance autonomously, and the starting moment is at least one of:

determining a boundary of a system information window where the time of the update configuration is located, such as a starting boundary of the system information window or an ending boundary of the system information window;

determining a boundary of a latest system frame number before or after the update configuration, such as a starting boundary of the system frame number or an ending boundary of the system frame number;

determining a boundary of a sending period of a system information block SIB1 before or after the update configuration, such as a starting boundary of the sending period or an ending boundary of the sending period, the system information block SIB1 being configured to carry common timing related information; and a moment of a latest update of the uplink timing advance before a moment of transmitting the uplink information to the base station.

FIG. 3 is a schematic flowchart showing a receiving control method, according to an embodiment of the present disclosure. As shown in FIG. 3, in some embodiments, the uplink information is a first message of a random access procedure, and updating the round-trip time according to the update configuration setting the moment of completing the transmission of the uplink information as the update moment includes:

in step S301, updating the round-trip time according to the update configuration setting a moment of a latest update of an uplink timing advance before transmitting the first message of the random access procedure as a starting moment and setting a moment of completing a transmission of the first message of the random access procedure as the update moment.

In an embodiment, when the uplink information is a first message of a random access procedure Msg1/MsgA, the moment of completing the transmission of the first message of the random access procedure may be determined as the update moment, and the moment of the latest update of the uplink timing advance before transmitting the first message of the random access procedure may be determined as the starting moment. In an example where the update configuration is applicable to an overall uplink timing advance, the round-trip time is updated according to a time drift rate R in the update configuration. In an example where the uplink timing advance is updated first, an uplink timing advance $TA_0$ at the starting moment may be determined first, and a time length to from the starting moment to the update moment may be determined, then an updated uplink timing advance is $TA_1=TA_0+t_0 \times R$.

Moreover, compared with the uplink timing advance before the update, the updated uplink timing advance has a higher degree of adaptability to a spatial relationship among the terminal, the satellite, and the base station at the update moment, so the uplink timing advance required at the update moment can be determined more accurately, and the determined round-trip time is more accurate.

FIG. 4 is a schematic flowchart showing a receiving control method, according to an embodiment of the present disclosure. As shown in FIG. 4, in some embodiments, the uplink information is a first message of a random access procedure, and receiving the downlink information transmitted by the base station, at least after the round-trip time between the terminal and the base station after transmitting the uplink information to the base station includes:

in step S401, opening a receiving time window for a second message of a random access procedure at a first downlink control channel receiving occasion at least after the round-trip time at a moment of completing a transmission of the first message of the random access procedure.

In an embodiment, when the uplink information is a first message of a random access procedure, the downlink information transmitted by a base station may be a second message of a random access procedure Msg2/MsgB (also referred to as a randomly accessed response RAR). The action of receiving the second message of the random access procedure may be to open a receiving time window for the second message of the random access procedure, and the receiving time window for the second message of the random access procedure may be opened at a first downlink control channel receiving time (PDCCH occasion) at least after waiting for the round-trip time starting from a moment of completing sending the first message of the random access procedure to the base station, so as to ensure that the terminal waits for at least the round-trip time and then starts to receive the second message of the random access procedure.

The round-trip time may correspond to the moment of completing the transmission of the first message of the random access procedure, so that the round-trip time at the moment of completing the transmission of the first message of the random access procedure can be determined accurately, and at least waiting for the round-trip time after transmitting the first message of the random access procedure to the base station, the downlink information transmitted by the base station is received. Accordingly, it helps to ensure the accuracy of the waiting time.

For example, the round-trip time may be determined by an updating way according to the embodiments shown in FIG. 3 or may be determined in other ways, and the determined round-trip time is associated with a positional relationship among the terminal, the satellite and the base station at the moment of completing sending the first message.

FIG. 5 is a schematic flowchart showing a receiving control method, according to an embodiment of the present disclosure. As shown in FIG. 5, in some embodiments, the method further includes:

in step S501, receiving a second message of a random access procedure, in which the second message of the random access procedure carries an adjustment value of an uplink timing advance; and in step S502, adjusting the uplink timing advance according to the adjustment value.

In an embodiment, the second message of the random access procedure sent by the base station to the terminal may carry the adjustment value for the uplink timing advance, and the terminal may adjust the uplink timing advance according to the adjustment value. The adjustment value may be set by the base station according to needs, which is not limited in the present disclosure.

FIG. 6 is a schematic flowchart showing a receiving control method, according to an embodiment of the present disclosure. As shown in FIG. 6, in some embodiments, the method further includes:

in step S601, updating a first round-trip time for transmitting a first message of a random access procedure according to the update configuration setting a moment of an update of the uplink timing advance before transmitting the first message of the random access procedure as a starting moment and setting a moment of receiving the second message of the random access procedure as an update moment, to obtain a second round-trip time.

In an embodiment, after receiving the second message of the random access procedure, the uplink timing advance may also be updated. Specifically, a first uplink timing advance used when transmitting the first message of the random access procedure may be updated. The terminal uses the first uplink timing advance to perform pre-compensation before sending the first message of the random access procedure to the base station, to ensure an uplink synchronization of sending the first message of the random access procedure.

The first uplink timing advance may be updated by setting the moment of the update of the uplink timing advance before transmitting the first message of the random access procedure as the starting moment and setting the moment of receiving the second message of the random access procedure as the update moment. For example, the first uplink timing advance is $TA_1$ determined in the above embodiments, then the round-trip time is updated according to a time drift rate R in the update configuration. In an example where the uplink timing advance is updated first, an uplink timing advance $TA_1$ at the starting moment may be determined first, and a time length $t_1$ from the starting moment to the update moment may be determined, then an updated uplink timing advance is $TA_2=TA_1+t_1 \times R$.

FIG. 7 is a schematic flowchart showing a receiving control method, according to an embodiment of the present disclosure. As shown in FIG. 7, in some embodiments, the uplink information is a third message of a random access procedure, and updating the round-trip time according to the update configuration setting the moment of completing the transmission of the uplink information as the update moment includes:

in step S701, updating the second round-trip time according to the update configuration setting the moment of receiving the second message of the random access procedure as a starting moment and setting a moment of completing a transmission of the third message of the random access procedure as the update moment.

In an embodiment, when the uplink information is a third message of a random access procedure Msg3, a moment of completing a transmission of the third message of the random access procedure may be determined as the update moment, and the moment of receiving the second message of the random access procedure may be determined as the starting moment. In an example where the update configuration is applicable to an overall uplink timing advance, the round-trip time is updated according to a time drift rate R in the update configuration. In an example where an uplink timing advance is updated first, an uplink timing advance at the starting moment may be determined first, which is the second timing advance $TA_2$ obtained in the above embodiments, and a time length $t_2$ from the starting moment to the update moment may be determined, then an updated uplink timing advance is $TA_3=TA_2+t_2 \times R$.

Moreover, compared with the uplink timing advance before the update, the updated uplink timing advance has a higher degree of adaptability to a spatial relationship among the terminal, the satellite, and the base station at the update moment, so the uplink timing advance required at the update moment can be determined more accurately, and the determined round-trip time is more accurate.

FIG. 8 is a schematic flowchart showing a receiving control method, according to an embodiment of the present disclosure. As shown in FIG. 8, in some embodiments, the uplink information is a third message of a random access procedure, and receiving the downlink information transmitted by the base station, at least after the round-trip time between the terminal and the base station after transmitting the uplink information to the base station includes:

in step S801, starting a contention resolution timer at a first time-domain symbol at least after the round-trip time at a moment of completing a transmission of the third message of the random access procedure.

In an embodiment, when the uplink information is the third message of the random access procedure Msg3, the downlink information transmitted by the base station may be a fourth message of a random access procedure Msg4. The action of receiving the fourth message of the random access procedure may be to start the contention resolution timer, and the contention resolution timer may be started at a first time-domain symbol (such as an orthogonal frequency division multiplexing OFDM symbol) at least after waiting for the round-trip time starting from the moment of completing the transmission of the third message of the random access procedure, so as to ensure that the terminal waits for at least the round-trip time and then starts to receive the fourth message of the random access procedure.

The round-trip time may correspond to the moment of completing the transmission of the third message of the random access procedure, so that the round-trip time at the moment of completing the transmission of the third message of the random access procedure can be determined accurately, and at least waiting for the round-trip time after transmitting the third message of the random access procedure to the base station, the downlink information transmitted by the base station is received. Accordingly, it helps to ensure the accuracy of the waiting time.

For example, the round-trip time may be determined by an updating way according to the embodiments shown in FIG. 7 or may be determined in other ways, and the determined round-trip time is associated with a positional relationship among the terminal, the satellite and the base station at the moment of completing sending the third message.

FIG. 9 is a schematic flowchart showing a receiving control method, according to an embodiment of the present disclosure. As shown in FIG. 9, in some embodiments, the uplink information is a physical uplink channel for transmitting a preconfigured uplink resource, and updating the round-trip time according to the update configuration setting the moment of completing the transmission of the uplink information as the update moment includes:

in step S901, updating the round-trip time according to the update configuration setting a previous update moment of the round-trip time as a starting moment and a setting moment of completing a transmission in the physical uplink channel as the update moment.

In an embodiment, when the uplink information is a physical uplink channel for transmitting a preconfigured uplink resource (such as a physical uplink shared channel PUSCH), a moment of completing a transmission in the physical uplink channel may be determined as the update moment, and a previous update moment of the round-trip time may be determined as the starting moment. In an example where the update configuration is applicable to an overall uplink timing advance, the round-trip time is updated according to a time drift rate R in the update configuration. In an example where an uplink timing advance is updated first, an uplink timing advance TA at the starting moment may be determined first, and a time length t from the starting moment to the update moment may be determined, then an updated uplink timing advance is $TA'=TA+t \times R$.

Moreover, compared with the uplink timing advance before the update, the updated uplink timing advance has a higher degree of adaptability to a spatial relationship among the terminal, the satellite, and the base station at the update moment, so the uplink timing advance required at the update moment can be determined more accurately, and the determined round-trip time is more accurate.

In an embodiment, the preconfigured uplink resource (PUR for short) may be requested by the terminal from the base station in a connected state. When the base station configures the preconfigured uplink resource for the terminal, the terminal can use the preconfigured uplink resource to communicate with the base station when specific conditions are met after the terminal enters an unconnected state. The above specific conditions include, but are not limited to, that a timing advance validity of the terminal meets requirements, and a signal quality change of a serving cell does not exceed a certain threshold. The preconfigured uplink resource may be configured to an Internet of Things terminal, such as a LTE eMTC/NB-IOT terminal.

FIG. 10 is a schematic flowchart showing a receiving control method, according to an embodiment of the present disclosure. As shown in FIG. 10, in some embodiments, the uplink information is a physical uplink channel for transmitting a preconfigured uplink resource, and receiving the downlink information transmitted by the base station, at least after the round-trip time between the terminal and the base station after transmitting the uplink information to the base station includes:

in step S1001, starting a response window timer for the preconfigured uplink resource, pur-Response Window Timer, after 4 subframes following a subframe at a moment of completing a transmission in the physical uplink channel and after the round-trip time.

In an embodiment, when the uplink information is a physical uplink channel for transmitting a preconfigured uplink resource, the downlink information transmitted by the base station may be a response for the preconfigured uplink resource, pur-Response. An action of receiving a response to the preconfigured uplink resource may be to start the pur-Response Window Timer, that is, the pur-Response is received before the pur-Response Window Timer expires. In this case, the pur-Response Window Timer may be started at least after waiting for 4 subframes and the round-trip time starting from a subframe at a moment of completing sending the physical uplink channel, to ensure that the terminal waits for at least 4 subframes and the round-trip time and then starts to receive the pur-Response.

In an embodiment, the round-trip time may correspond to the moment of completing the transmission in the physical uplink channel, so that the round-trip time at the moment of completing the transmission in the physical uplink channel can be determined accurately, and at least waiting for the round-trip time after transmitting the physical uplink channel to the base station, the downlink information transmitted by the base station is received. Accordingly, it helps to ensure the accuracy of the waiting time.

For example, the round-trip time may be determined by an updating way according to the embodiments shown in FIG. 9 or may be determined in other ways, and the determined round-trip time is associated with a positional relationship among the terminal, the satellite and the base station at the moment of completing sending the physical uplink channel.

FIG. 11 is a schematic flowchart showing a receiving control method, according to an embodiment of the present disclosure. As shown in FIG. 11, in some embodiments, the uplink information is a first transmission among multiple uplink transmissions, and updating the round-trip time according to the update configuration setting the moment of completing the transmission of the uplink information as the update moment includes:

in step S1101, updating the round-trip time according to the update configuration setting a previous update moment of the round-trip time as a starting moment and setting a moment of completing the first transmission as the update moment.

In an embodiment, the terminal may perform multiple repeated uplink transmissions in some cases. When the uplink information is a first transmission among the multiple uplink transmissions, a moment of completing the first transmission may be determined as the update moment, and a previous update moment of the round-trip time may be determined as the starting moment. In an example where the update configuration is applicable to an overall uplink timing advance, the round-trip time is updated according to a time drift rate R in the update configuration. In an example where an uplink timing advance is updated first, an uplink timing advance TA at the starting moment may be determined first, and a time length t from the starting moment to the update moment may be determined, then an updated uplink timing advance is TA'=TA+t×R.

Moreover, compared with the uplink timing advance before the update, the updated uplink timing advance has a higher degree of adaptability to a spatial relationship among the terminal, the satellite, and the base station at the update moment, so the uplink timing advance required at the update moment can be determined more accurately, and the determined round-trip time is more accurate.

FIG. 12 is a schematic flowchart showing a receiving control method, according to an embodiment of the present disclosure. As shown in FIG. 12, in some embodiments, the uplink information is a first transmission among multiple uplink transmissions, and receiving the downlink information transmitted by the base station, at least after the round-trip time between the terminal and the base station after transmitting the uplink information to the base station includes:

in step S1201, starting a discontinuous reception hybrid automatic retransmission request round-trip time uplink timer, drx-HARQ-RTT-TimerUL, at least after the round-trip time at a moment of completing the first transmission.

In an embodiment, when the uplink information is a first transmission among multiple uplink transmissions, the downlink information transmitted by the base station may be an uplink configuration. An action of receiving the uplink configuration may be to start a discontinuous reception hybrid automatic retransmission request round-trip time uplink timer, that is, the uplink configuration sent by the base station is received before this timer expires. In this case, the discontinuous reception hybrid automatic retransmission request round-trip time uplink timer may be started at least after waiting for the round-trip time starting from the moment of completing sending the first transmission among the multiple uplink transmissions, to ensure that the terminal waits for at least the round-trip time and then starts to receive the uplink configuration.

The round-trip time may correspond to the moment of completing a transmission of the first transmission, so that the round-trip time at the moment of completing the transmission of the first transmission can be determined accurately, and at least waiting for the round-trip time after transmitting the first transmission to the base station, the downlink information transmitted by the base station is received. Accordingly, it helps to ensure the accuracy of the waiting time.

For example, the round-trip time may be determined by an updating way according to the embodiments shown in FIG. 11 or may be determined in other ways, and the determined round-trip time is associated with a positional relationship among the terminal, the satellite and the base station at the moment of completing sending the first transmission.

FIG. 13 is a schematic flowchart showing a receiving control method, according to an embodiment of the present disclosure. As shown in FIG. 13, in some embodiments, the uplink information is a first retransmission (also called a first repetition) among multiple retransmissions, and updating the round-trip time according to the update configuration setting the moment of completing the transmission of the uplink information as the update moment includes:

in step S1301, updating the round-trip time according to the update configuration setting a previous update moment of the round-trip time as a starting moment and setting a moment of completing the first retransmission as the update moment.

In an embodiment, the terminal may perform multiple retransmissions in some cases. For example, after receiving the hybrid automatic retransmission request fed back by the base station, the terminal determines that the base station has failed to receive the information sent by the terminal, then multiple retransmissions of the information may be performed. When the uplink information is a first retransmission among the multiple retransmissions, a moment of completing the first retransmission may be determined as the update moment, and a previous update moment of the round-trip time may be determined as the starting moment. In an example where the update configuration is applicable to an overall uplink timing advance, the round-trip time is updated according to a time drift rate R in the update configuration. In an example where an uplink timing advance is updated first, an uplink timing advance TA at the starting moment may be determined first, and a time length t from the starting moment to the update moment may be determined, then an updated uplink timing advance is TA'=TA+t×R.

Moreover, compared with the uplink timing advance before the update, the updated uplink timing advance has a higher degree of adaptability to a spatial relationship among the terminal, the satellite, and the base station at the update moment, so the uplink timing advance required at the update moment can be determined more accurately, and the determined round-trip time is more accurate.

FIG. 14 is a schematic flowchart showing a receiving control method, according to an embodiment of the present disclosure. As shown in FIG. 14, in some embodiments, the uplink information is a first retransmission among multiple retransmissions, and receiving the downlink information transmitted by the base station, at least after the round-trip time between the terminal and the base station after transmitting the uplink information to the base station includes:

in step S1401, starting a discontinuous reception hybrid automatic retransmission request round-trip time uplink timer, drx-HARQ-RTT-TimerUL, at least after the round-trip time at a moment of completing the first retransmission.

In an embodiment, when the uplink information is a first retransmission among multiple retransmissions, the downlink information transmitted by the base station may be an uplink configuration. An action of receiving the uplink configuration may be to start a discontinuous reception hybrid automatic retransmission request round-trip time uplink timer, that is, the uplink configuration sent by the base station is received before this timer expires. In this case, the discontinuous reception hybrid automatic retransmission request round-trip time uplink timer may be started at least after waiting for the round-trip time starting from the moment of completing sending the first retransmission among the multiple retransmissions, to ensure that the terminal waits for at least the round-trip time and then starts to receive the uplink configuration.

The round-trip time may correspond to the moment of completing the transmission of the first retransmission, so that the round-trip time at the moment of completing the transmission of the first retransmission can be determined accurately, and at least waiting for the round-trip time after transmitting the first retransmission to the base station, the downlink information transmitted by the base station is received. Accordingly, it helps to ensure the accuracy of the waiting time.

For example, the round-trip time may be determined by an updating way according to the embodiments shown in FIG. 13 or may be determined in other ways, and the determined round-trip time is associated with a positional relationship among the terminal, the satellite and the base station at the moment of completing sending the first retransmission.

FIG. 15 is a schematic flowchart showing a receiving control method, according to an embodiment of the present disclosure. As shown in FIG. 15, in some embodiments, the uplink information is feedback information carrying a downlink hybrid automatic retransmission request, DL HARQ feedback, and updating the round-trip time according to the update configuration setting the moment of completing the transmission of the uplink information as the update moment includes:

in step S1501, updating the round-trip time according to the update configuration setting a previous update moment of the round-trip time as a starting moment and a first time-domain symbol after completing sending the feedback information as the update moment.

In an embodiment, the terminal may send feedback information to the base station after receiving the downlink information sent by the base station. The feedback information carries a downlink hybrid automatic retransmission request, to inform the base station whether the downlink information is successfully received. When the uplink information is the feedback information carrying the downlink hybrid automatic retransmission request, a first time-domain symbol after completing sending the feedback information may be determined as the update moment, and a previous update moment of the round-trip time may be determined as the starting moment. In an example where the update configuration is applicable to an overall uplink timing advance, the round-trip time is updated according to a time drift rate R in the update configuration. In an example where an uplink timing advance is updated first, an uplink timing advance TA at the starting moment may be determined first, and a time length t from the starting moment to the update moment may be determined, then an updated uplink timing advance is TA'=TA+t×R.

Moreover, compared with the uplink timing advance before the update, the updated uplink timing advance has a higher degree of adaptability to a spatial relationship among the terminal, the satellite, and the base station at the update moment, so the uplink timing advance required at the update moment can be determined more accurately, and the determined round-trip time is more accurate.

FIG. 16 is a schematic flowchart showing a receiving control method, according to an embodiment of the present disclosure. As shown in FIG. 16, in some embodiments, the uplink information is feedback information carrying a downlink hybrid automatic retransmission request, and receiving the downlink information transmitted by the base station, at least after the round-trip time between the terminal and the base station after transmitting the uplink information to the base station includes:

in step S1601, starting a discontinuous reception hybrid automatic retransmission request round-trip time downlink timer, drx-HARQ-RTT-TimerDL, at least after the round-trip time at a moment of completing sending the feedback information.

In an embodiment, when the uplink information is feedback information carrying a downlink hybrid automatic retransmission request, the downlink information transmitted by the base station may be a downlink configuration. An action of receiving the downlink configuration may be to start a discontinuous reception hybrid automatic retransmission request round-trip time downlink timer, that is, the downlink configuration sent by the base station is received before this timer expires. In this case, the discontinuous reception hybrid automatic retransmission request round-trip time downlink timer may be started at least after waiting for the round-trip time starting from the moment of completing sending the feedback information, to ensure that the terminal waits for at least the round-trip time and then starts to receive the downlink configuration.

The round-trip time may correspond to the moment of completing sending the feedback information, so that the round-trip time at the moment of completing the transmission of the feedback information can be determined accurately, and at least waiting for the round-trip time after transmitting the feedback information to the base station, the downlink information transmitted by the base station is received. Accordingly, it helps to ensure the accuracy of the waiting time.

For example, the round-trip time may be determined by an updating way according to the embodiments shown in FIG. 16 or may be determined in other ways, and the determined round-trip time is associated with a positional relationship among the terminal, the satellite and the base station at the moment of completing sending the feedback information.

A receiving control method is also provided in embodiments of the present disclosure, which may be performed by a base station, and the base station may communicate with a terminal. The terminal includes, but is not limited to, electronic devices such as a mobile phone, a tablet computer, a wearable device, a sensor, an Internet of Things device, etc. The base station includes, but is not limited to, a 4G base station, a 5G base station, or a 6G base station.

In an embodiment, the terminal and the base station are located on a ground, and the terminal and the base station can communicate in Non-Terrestrial Networks through an aerial device. For example, the base station first sends information to the aerial device, and then the aerial device sends the information to the terminal. The aerial device includes, but is not limited to, a satellite, an unmanned aircraft, an aerial platform, etc., and the aerial device may move in the air.

The receiving control method may include following step.

The receiving control method is performed by a base station and includes:

receiving uplink information transmitted by a terminal, at least after a round-trip time between the terminal and the base station after transmitting downlink information to the terminal.

According to embodiments of the present disclosure, the base station may not continuously receive the downlink information sent by the terminal for the downlink information immediately after transmitting the downlink information to the terminal, but at least wait for the round-trip time between the terminal and the base station before receiving the uplink information transmitted by the terminal. During the waiting process, the base station may not monitor an uplink channel on which the terminal sends the uplink information, which is beneficial to reduce the power consumption of the terminal.

In some embodiments, the method further includes: updating the round-trip time according to an update configuration setting a moment of completing a transmission of the downlink information as an update moment.

According to embodiments of the present disclosure, the base station may update the round-trip time according to the update configuration. For example, an uplink timing advance may be updated first according to the update configuration, and then the round-trip time is determined according to the updated uplink timing advance. During a movement of the aerial device, even if information about the uplink timing advance reported by the terminal is not received, the adjustment of the uplink timing advance can also be completed automatically, and then the adjustment of the round-trip time is completed, which is beneficial to reduce the signaling overhead and reduce the power consumption of the terminal.

Corresponding to the foregoing embodiments of the receiving control methods, the present disclosure also provides embodiments of a receiving control device.

FIG. 17 is a schematic block diagram showing a receiving control device, according to an embodiment of the present disclosure. The receiving control device shown in this embodiment may be applied to a terminal, and the terminal includes, but is not limited to, electronic devices, such as a mobile phone, a tablet computer, a wearable device, a sensor, an Internet of Things device, etc. The terminal may serve as a user equipment to communicate with a base station, and the base station includes, but is not limited to, a 4G base station, a 5G base station, or a 6G base station.

In an embodiment, the terminal and the base station are located on a ground, and the terminal and the base station can communicate in Non-Terrestrial Networks through an aerial device. For example, the base station first sends information to the aerial device, and then the aerial device sends the information to the terminal. The aerial device includes, but is not limited to, a satellite, an unmanned aircraft, an aerial platform, etc., and the aerial device may move in the air.

As shown in FIG. 17, the receiving control device may include: a receiving control module 1701.

The receiving control module 1701 is configured to receive downlink information transmitted by a base station, at least after a round-trip time between the terminal and the base station after transmitting uplink information to the base station.

In some embodiments, the round-trip time corresponds to a moment of completing a transmission of the uplink information.

FIG. 18 is a schematic block diagram showing a receiving control device, according to an embodiment of the present disclosure. As shown in FIG. 18, the device further includes: a first update module 1801.

The first update module 1801 is configured to update the round-trip time according to an update configuration setting the moment of completing the transmission of the uplink information as an update moment.

In an embodiment, the uplink information is a first message of a random access procedure, and the first update module is configured to update the round-trip time according to the update configuration setting a moment of a latest update of an uplink timing advance before transmitting the first message of the random access procedure as a starting moment and setting a moment of completing a transmission of the first message of the random access procedure as the update moment.

In an embodiment, the uplink information is a first message of a random access procedure, and the receiving control module is configured to open a receiving time window for a second message of a random access procedure at a first downlink control channel receiving occasion at least after the round-trip time at a moment of completing a transmission of the first message of the random access procedure. The round-trip time corresponds to the moment of completing the transmission of the first message.

FIG. 19 is a schematic block diagram showing a receiving control device, according to an embodiment of the present disclosure. As shown in FIG. 19, the device further includes: a response receiving module 1901 and an adjustment module 1902.

The response receiving module 1901 is configured to receive a second message of a random access procedure. The second message of the random access procedure carries an adjustment value of an uplink timing advance.

The adjustment module 1902 is configured to adjusting the uplink timing advance according to the adjustment value.

FIG. 20 is a schematic block diagram showing a receiving control device, according to an embodiment of the present disclosure. As shown in FIG. 20, the device further includes: a second update module 2001.

The second update module 2001 is configured to update a first round-trip time for transmitting a first message of a random access procedure according to the update configuration setting a moment of an update of the uplink timing advance before transmitting the first message of the random access procedure as a starting moment and setting a moment of receiving the second message of the random access procedure as an update moment, to obtain a second round-trip time.

In an embodiment, the uplink information is a third message of a random access procedure, and the first update module is configured to update the second round-trip time according to the update configuration setting the moment of receiving the second message of the random access procedure as a starting moment and setting a moment of completing a transmission of the third message of the random access procedure as the update moment.

In an embodiment, the uplink information is a third message of a random access procedure, and the receiving control module is configured to start a contention resolution timer at a first time-domain symbol at least after the round-trip time at a moment of completing a transmission of the third message of the random access procedure. The round-trip time corresponds to the moment of completing the transmission of the third message.

In an embodiment, the first update module is configured to update the round-trip time according to the update configuration setting a previous update moment of the round-trip time as a starting moment and setting a moment of completing a transmission in the physical uplink channel as the update moment.

In an embodiment, the uplink information is a physical uplink channel for transmitting a preconfigured uplink resource, and the receiving control module is configured to start a response window timer for the preconfigured uplink resource after 4 subframes following a subframe at a moment of completing a transmission in the physical uplink channel and after the round-trip time.

In an embodiment, the round-trip time corresponds to the moment of completing the transmission in the physical uplink channel.

In an embodiment, the first update module is configured to update the round-trip time according to the update configuration setting a previous update moment of the round-trip time as a starting moment and setting a moment of completing the first transmission as the update moment.

In an embodiment, the uplink information is a first transmission among multiple uplink transmissions, and the receiving control module is configured to start a discontinuous reception hybrid automatic retransmission request round-trip time uplink timer at least after the round-trip time at a moment of completing the first transmission. The round-trip time corresponds to the moment of completing a transmission of the first transmission.

In an embodiment, the uplink information is a first retransmission among multiple retransmissions, and the first update module is configured to update the round-trip time according to the update configuration setting a previous update moment of the round-trip time as a starting moment and setting a moment of completing the first retransmission as the update moment.

In an embodiment, the uplink information is a first retransmission among multiple retransmissions, and the receiving control module is configured to start a discontinuous reception hybrid automatic retransmission request round-trip time uplink timer at least after the round-trip time at a moment of completing the first retransmission. The round-trip time may correspond to the moment of completing the transmission of the first retransmission.

In an embodiment, the uplink information is feedback information carrying a downlink hybrid automatic retransmission request, and the first update module is configured to update the round-trip time according to the update configuration setting a previous update moment of the round-trip time as a starting moment and a first time-domain symbol after completing sending the feedback information as the update moment.

In an embodiment, the uplink information is feedback information carrying a downlink hybrid automatic retransmission request, and the receiving control module is configured to start a discontinuous reception hybrid automatic retransmission request round-trip time downlink timer at least after the round-trip time at a moment of completing sending the feedback information. The round-trip time corresponds to the moment of completing sending the feedback information.

A receiving control device is also provided in embodiments of the present disclosure, which may be applied to a base station, and the base station may communicate with a terminal. The terminal includes, but is not limited to, electronic devices such as a mobile phone, a tablet computer, a wearable device, a sensor, an Internet of Things device, etc. The base station includes, but is not limited to, a 4G base station, a 5G base station, or a 6G base station.

In an embodiment, the terminal and the base station are located on a ground, and the terminal and the base station can communicate in Non-Terrestrial Networks through an aerial device. For example, the base station first sends information to the aerial device, and then the aerial device sends the information to the terminal. The aerial device includes, but is not limited to, a satellite, an unmanned aircraft, an aerial platform, etc., and the aerial device may move in the air.

The receiving control device may include: a receiving control module.

The receiving control module is configured to receive uplink information transmitted by a terminal, at least after a round-trip time between the terminal and the base station after transmitting downlink information to the terminal.

In some embodiments, the receiving control device further includes: an update module.

The update module is configured to update the round-trip time according to an update configuration setting a moment of completing a transmission of the downlink information as an update moment.

With respect to the devices in the above embodiments, the specific manners in which individual modules perform operations have been described in detail in the embodiments of the related methods, which will not be elaborated herein.

Since the device embodiments substantially correspond to the method embodiments, reference may be made to the related descriptions of the method embodiments. The above-described device embodiments are merely for the purpose of illustration, in which the modules described as separate components may be or may not be physically separated, and the components displayed as modules may be or may not be physical modules, that is, either located at one place or distributed onto a plurality of network modules. The object of embodiments of the present disclosure may be achieved by some or all of the modules in accordance with practical requirements. Embodiments of the present disclosure would be appreciated and executable by those skilled in the art without creative efforts.

An electronic device is also provided in embodiments of the present disclosure, which includes: a processor; and a memory configured to store instructions executable by the processor. The processor is configured to execute the method performed by a terminal according to any of the above embodiments.

An electronic device is also provided in embodiments of the present disclosure, which includes: a processor; and a memory configured to store instructions executable by the processor. The processor is configured to execute the method performed by a base station according to any of the above embodiments.

A computer-readable storage medium is also provided in embodiments of the present disclosure, having stored therein computer programs that, when executed by a processor, cause steps in the method performed by a terminal according to any of the above embodiments to be implemented.

A computer-readable storage medium is also provided in embodiments of the present disclosure, having stored therein computer programs that, when executed by a processor, cause steps in the method performed by a base station according to any of the above embodiments to be implemented.

According to embodiments of the present disclosure, the terminal may not continuously receive the downlink information transmitted by the base station immediately after transmitting the uplink information to the base station, but at least wait for the round-trip time between the terminal and the base station before receiving the downlink information transmitted by the base station. During the waiting process, the terminal may not monitor a downlink channel on which the base station sends the downlink information, which is beneficial to reduce the power consumption of the terminal.

In addition, the terminal may update the round-trip time according to an update configuration, so that the round-trip time is determined according to an updated uplink timing advance. During a movement of an aerial device, even if a network does not send an adjustment command of the uplink timing advance to the terminal, the adjustment of the uplink timing advance can also be completed automatically, which is beneficial to reduce the signaling overhead and reduce the power consumption of the terminal.

Moreover, compared with the uplink timing advance before the update, the updated uplink timing advance has a higher degree of adaptability to a spatial relationship among the terminal, the satellite, and the base station at the update moment, so the uplink timing advance required at the update moment can be determined more accurately, and the determined round-trip time is more accurate.

FIG. 21 is a schematic block diagram showing a device 2100 for receiving control, according to an embodiment of the present disclosure. For example, the device 2100 may be a mobile phone, a computer, a digital broadcast terminal, a messaging device, a game console, a tablet device, a medical device, a fitness device, a personal digital assistant, or the like.

Referring to FIG. 21, the device 2100 may include one or more of the following components: a processing component 2102, a memory 2104, a power component 2106, a multimedia component 2108, an audio component 2110, an input/output (I/O) interface 2112, a sensor component 2114, and a communication component 2116.

The processing component 2102 typically controls overall operations of the device 2100, such as the operations associated with display, phone calls, data communications, camera operations, and recording operations. The processing component 2102 can include one or more processors 2120 to execute instructions to perform all or some of the steps in the above-described methods. Moreover, the processing component 2102 may include one or more modules which facilitate the interaction between the processing component 2102 and other components. For instance, the processing component 2102 may include a multimedia module to facilitate the interaction between the multimedia component 2108 and the processing component 2102.

The memory 2104 is configured to store various types of data to support the operation of the device 2100. Examples of such data include instructions for any applications or methods operated on the device 2100, contact data, phonebook data, messages, pictures, videos, etc. The memory 2104 may be implemented setting any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2106 provides power to various components of the device 2100. The power component 2106 may include a power management system, one or more power sources, and any other components associated with the generation, management, and distribution of power in the device 2100.

The multimedia component 2108 includes a screen providing an output interface between the device 2100 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 2108 includes a front camera and/or a rear camera. The front camera and/or the rear camera may receive an external multimedia datum while the device 2100 is in an operation mode, such as a photographing mode or a video mode. Each of the front camera and the rear camera may be a fixed optical lens system or have focus and optical zoom capability.

The audio component 2110 is configured to output and/or input audio signals. For example, the audio component 2110 includes a microphone (MIC) configured to receive an external audio signal when the device 2100 is in an operation mode, such as a call mode, a recording mode, and a voice recognition mode. The received audio signal may be further stored in the memory 2104 or transmitted via the communication component 2116. In some embodiments, the audio component 2110 further includes a speaker to output audio signals.

The I/O interface 2112 provides an interface between the processing component 2102 and peripheral interface modules, such as keyboards, click wheels, buttons, and the like. The buttons may include, but are not limited to, a home button, a volume button, a starting button, and a locking button.

The sensor component 2114 includes one or more sensors to provide status assessments of various aspects of the device 2100. For instance, the sensor component 2114 may detect an open/closed status of the device 2100, relative positioning of components, e.g., the display and the keypad, of the device 2100. The sensor component 2114 may also detect a change in position of the device 2100 or a component of the device 2100, a presence or absence of user contact with the device 2100, an orientation or an acceleration/deceleration of the device 2100, and a change in temperature of the device 2100. The sensor component 2114 may include a proximity sensor configured to detect the presence of nearby objects without any physical contact. The sensor component 2114 may further include a light sensor, such as a CMOS or CCD image sensor, for use in imaging applications. In some embodiments, the sensor component 2114 may further include an accelerometer sensor, a gyroscope sensor, a magnetic sensor, a pressure sensor, or a temperature sensor.

The communication component 2116 is configured to facilitate communication, wired or wireless, between the device 2100 and other devices. The device 2100 can access a wireless network based on a communication standard, such as WiFi, 2G or 3G, 4G LTE, 5G NR or a combination thereof. In an illustrative embodiment, the communication component 2116 receives a broadcast signal or broadcast associated information from an external broadcast management system via a broadcast channel. In an illustrative embodiment, the communication component 2116 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an illustrative embodiment, the device 2100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic elements, for performing the above-mentioned method.

In an illustrative embodiment, there is also provided a non-transitory computer readable storage medium including instructions, such as included in the memory 2104, executable by the processor 2120 in the device 2100, for completing the above-mentioned method. For example, the non-transitory computer-readable storage medium may be a ROM, a random access memory (RAM), a CD-ROM, a magnetic tape, a floppy disc, an optical data storage device, and the like.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

It is to be noted that in this context, relational terms such as first and second are used solely to distinguish one entity or operation from another entity or operation, it does not necessarily require or imply any such actual relationship or sequence between these entities or operations. The term "include", "comprise" or any other variations thereof is intended to cover a non-exclusive inclusion, so that a process, method, article or device that includes a series of elements does not only include those elements, but also includes other elements that are not explicitly listed, or also includes elements inherent in such a process, method, article or device. Without further restrictions, an element defined by the statement "including a . . . " does not exclude the existence of another identical element in the process, method, article or device that includes the element.

The methods and device provided by the embodiments of the present disclosure have been described in detail above, and specific examples are used herein to illustrate the principle and implementations of the present disclosure. The description of the above embodiments is only used to help understand the methods and core ideas of the present disclosure. At the same time, for those skilled in the art, some changes may be made in the specific implementation and application scope according to the idea of the present disclosure. In summary, the content of the specification should not be construed as a limitation on the present disclosure.

What is claimed is:

1. A receiving control method, performed by a terminal and comprising:

receiving downlink information transmitted by a base station, at least after a round-trip time between the terminal and the base station after transmitting uplink information to the base station;

wherein the uplink information is a physical uplink channel for transmitting a preconfigured uplink resource, and receiving the downlink information transmitted by the base station, at least after the round-trip time between the terminal and the base station after transmitting the uplink information to the base station comprises:

starting a response window timer for the preconfigured uplink resource after 4 subframes following a subframe at a moment of completing a transmission in the physical uplink channel and after the round-trip time.

2. The method according to claim 1, wherein the round-trip time corresponds to a moment of completing a transmission of the uplink information.

3. The method according to claim 2, further comprising:
updating the round-trip time according to an update configuration setting the moment of completing the transmission of the uplink information as an update moment.

4. The method according to claim 3, wherein the uplink information is a first message of a random access procedure, and updating the round-trip time according to the update configuration setting the moment of completing the transmission of the uplink information as the update moment comprises:
updating the round-trip time according to the update configuration setting a moment of a latest update of an uplink timing advance before transmitting the first message of the random access procedure as a starting moment and setting a moment of completing a transmission of the first message of the random access procedure as the update moment.

5. The method according to claim 3, further comprising:
receiving a second message of a random access procedure, wherein the second message of the random access procedure carries an adjustment value of an uplink timing advance;
adjusting the uplink timing advance according to the adjustment value; and
updating a first round-trip time for transmitting a first message of a random access procedure according to the update configuration setting a moment of an update of the uplink timing advance before transmitting the first message of the random access procedure as a starting moment and setting a moment of receiving the second message of the random access procedure as an update moment, to obtain a second round-trip time.

6. The method according to claim 5, wherein the uplink information is a third message of a random access procedure, and updating the round-trip time according to the update configuration setting the moment of completing the transmission of the uplink information as the update moment comprises:
updating the second round-trip time according to the update configuration setting the moment of receiving the second message of the random access procedure as a starting moment and setting a moment of completing a transmission of the third message of the random access procedure as the update moment.

7. The method according to claim 3, wherein the uplink information is a physical uplink channel for transmitting a preconfigured uplink resource, and updating the round-trip time according to the update configuration setting the moment of completing the transmission of the uplink information as the update moment comprises:
updating the round-trip time according to the update configuration setting a previous update moment of the round-trip time as a starting moment and setting a moment of completing a transmission in the physical uplink channel as the update moment.

8. The method according to claim 3, wherein the uplink information is a first transmission among multiple uplink transmissions, and updating the round-trip time according to the update configuration setting the moment of completing the transmission of the uplink information as the update moment comprises:
updating the round-trip time according to the update configuration setting a previous update moment of the round-trip time as a starting moment and setting a moment of completing the first transmission as the update moment.

9. The method according to claim 3, wherein the uplink information is a first retransmission among multiple retransmissions, and updating the round-trip time according to the update configuration setting the moment of completing the transmission of the uplink information as the update moment comprises:
updating the round-trip time according to the update configuration setting a previous update moment of the round-trip time as a starting moment and setting a moment of completing the first retransmission as the update moment.

10. The method according to claim 3, wherein the uplink information is feedback information carrying a downlink hybrid automatic retransmission request, and updating the round-trip time according to the update configuration setting the moment of completing the transmission of the uplink information as the update moment comprises:
updating the round-trip time according to the update configuration setting a previous update moment of the round-trip time as a starting moment and a first time-domain symbol after completing sending the feedback information as the update moment.

11. The method according to claim 2, wherein the uplink information is a first message of a random access procedure, and receiving the downlink information transmitted by the base station, at least after the round-trip time between the terminal and the base station after transmitting the uplink information to the base station comprises:
opening a receiving time window for a second message of a random access procedure at a first downlink control channel receiving occasion at least after the round-trip time at a moment of completing a transmission of the first message of the random access procedure; wherein the round-trip time corresponds to the moment of completing the transmission of the first message.

12. The method according to claim 2, wherein the uplink information is a third message of a random access procedure, and receiving the downlink information transmitted by the base station, at least after the round-trip time between the terminal and the base station after transmitting the uplink information to the base station comprises:
starting a contention resolution timer at a first time-domain symbol at least after the round-trip time at a moment of completing a transmission of the third message of the random access procedure;
wherein the round-trip time corresponds to the moment of completing the transmission of the third message.

13. The method according to claim 2,
wherein the round-trip time corresponds to the moment of completing the transmission in the physical uplink channel.

14. The method according to claim 2, wherein the uplink information is a first transmission among multiple uplink transmissions, and receiving the downlink information transmitted by the base station, at least after the round-trip time between the terminal and the base station after transmitting the uplink information to the base station comprises:
starting a discontinuous reception hybrid automatic retransmission request round-trip time uplink timer at least after the round-trip time at a moment of completing the first transmission;
wherein the round-trip time corresponds to the moment of completing a transmission of the first transmission.

15. The method according to claim 2, wherein the uplink information is a first retransmission among multiple retransmissions, and receiving the downlink information transmitted by the base station, at least after the round-trip time between the terminal and the base station after transmitting the uplink information to the base station comprises:

starting a discontinuous reception hybrid automatic retransmission request round-trip time uplink timer at least after the round-trip time at a moment of completing a transmission of the first retransmission;

wherein the round-trip time corresponds to the moment of completing the transmission of the first retransmission.

16. The method according to claim 2, wherein the uplink information is feedback information carrying a downlink hybrid automatic retransmission request, and receiving the downlink information transmitted by the base station, at least after the round-trip time between the terminal and the base station after transmitting the uplink information to the base station comprises:

starting a discontinuous reception hybrid automatic retransmission request round-trip time downlink timer at least after the round-trip time at a moment of completing sending the feedback information;

wherein the round-trip time corresponds to the moment of completing sending the feedback information.

17. A terminal, comprising:

a processor;

a memory configured to store instructions executable by the processor;

wherein the processor is configured to execute a receiving control method comprising:

receiving downlink information transmitted by a base station, at least after a round-trip time between the terminal and the base station after transmitting uplink information to the base station;

wherein the uplink information is a physical uplink channel for transmitting a preconfigured uplink resource, and receiving the downlink information transmitted by the base station, at least after the round-trip time between the terminal and the base station after transmitting the uplink information to the base station comprises:

starting a response window timer for the preconfigured uplink resource after 4 subframes following a subframe at a moment of completing a transmission in the physical uplink channel and after the round-trip time.

* * * * *